United States Patent [19]

Myers

[11] Patent Number: 4,686,276

[45] Date of Patent: Aug. 11, 1987

[54] PROCESS FOR PREPARING POLY (ALKYLENE CARBONATES)

[75] Inventor: Michael O. Myers, Baton Rouge, La.

[73] Assignee: The Dow Chemical Company, Midland, Mich.

[21] Appl. No.: 814,851

[22] Filed: Dec. 30, 1985

[51] Int. Cl.$^4$ ............................................. C08G 63/62
[52] U.S. Cl. .................... 528/371; 528/370; 528/405; 558/265
[58] Field of Search ...................... 528/371, 405, 370; 558/265

[56] References Cited

U.S. PATENT DOCUMENTS

| | | | |
|---|---|---|---|
| 3,248,414 | 4/1966 | Stevens | 528/196 X |
| 3,248,415 | 4/1966 | Stevens | 528/196 X |
| 3,248,416 | 4/1966 | Stevens | 528/373 X |
| 3,585,168 | 6/1971 | Inoue et al. | 528/371 |
| 3,689,462 | 9/1972 | Maximovich | 528/371 |
| 3,764,457 | 10/1973 | Chang et al. | 161/183 |
| 3,896,090 | 7/1975 | Maximovich | 528/371 |
| 4,066,630 | 1/1978 | Dixon et al. | 528/370 X |
| 4,222,954 | 9/1980 | Cuscurida et al. | 260/463 |
| 4,264,752 | 4/1981 | Watson | 525/467 |
| 4,267,120 | 5/1981 | Cuscurida et al. | 260/463 |
| 4,330,481 | 5/1982 | Timberlake et al. | 260/463 |
| 4,528,364 | 7/1985 | Prier | 528/371 X |

*Primary Examiner*—Earl Nielsen

[57] ABSTRACT

An improved process for the preparation of poly(alkylene carbonate) polymer by the reaction of alkylene oxide with carbon dioxide and/or an alkylene carbonate at an elevated temperature and pressure is disclosed. The improvement comprises conducting said reaction in the presence of a catalyst mixture comprising an alkaline catalyst and a stannate compound.

15 Claims, No Drawings

PROCESS FOR PREPARING POLY (ALKYLENE CARBONATES)

BACKGROUND OF THE INVENTION

This invention relates to a process for preparing poly-(alkylene carbonates).

Poly(alkylene carbonates) (sometimes referred to herein as PACs or PAC polyols) are copolymers prepared by reacting carbon dioxide or an alkylene carbonate with an alkylene oxide to form a polymer containing repeating alkylene carbonate units. PACs are useful, for example, as raw materials for the production of polyurethanes.

PACs are conventionally prepared by reacting carbon dioxide or an alkylene carbonate with an alkylene oxide such as ethylene oxide or propylene oxide at elevated pressure and temperature. Two major classes of catalysts are used for this reaction. Alkali metal salts such as potassium carbonate are used to prepare a PAC having a carbon dioxide content (the weight percentage of the polymer attributable to C(O)O groups) of about 0.1 to about 15%. Stannate salts such as sodium stannate provide a PAC having a carbon dioxide content of about 25–33%. When these catalysts are used, the carbon dioxide content of the polymer is controlled almost entirely by the choice of catalyst, and variations in the ratios of materials and in the reaction conditions have little effect on the composition of the product polymer. In addition, these catalysts require that the polymerization be conducted very slowly, or under very high pressures, or both. Another disadvantage is that the product PACs usually contain high levels of by-products notably alkylene carbonates.

Unfortunately, PACs having carbon dioxide contents from about 10–25% are of particular interest in preparing polyurethanes. PACs having such carbon dioxide contents display the best combination of solvent resistance and low viscosity. These materials cannot be prepared in any quantity directly for ethylene oxide and carbon dioxide using the aforementioned alkali metal salts and stannate catalysts. PACs having such carbon dioxide contents can be prepared using certain catalysts such as arsenate salts. However, these catalysts are very toxic, and the rate of polymerization achieved with these catalysts is too slow to be commercially viable.

Accordingly, it would be desirable to provide a process whereby a PAC can be prepared having a carbon dioxide content which can be varied as desired. It would also be desirable to provide a process which provides a higher reaction rate, and, preferably, lower reaction pressures than conventional processes.

SUMMARY OF THE INVENTION

This invention is such a process. In this process a poly(alkylene carbonate) polymer is prepared by the reaction of alkylene oxide with carbon dioxide and/or an alkylene carbonate at an elevated temperature and pressure, the improvement comprising conducting said reaction in the presence of a catalytic amount of a catalyst mixture comprising a alkaline catalyst as defined herein and a stannate compound.

Surprisingly, use of the catalyst mixture of this invention permits the formation of a PAC having a carbon dioxide content anywhere from about 0.1 to about 33% by weight. In addition, this catalyst mixture permits the use of either carbon dioxide or an alkylene carbonate, or mixtures thereof as a starting material. In addition, this catalyst mixture provides for a faster reaction, and in certain embodiments a lower pressure reaction.

DETAILED DESCRIPTION OF THE INVENTION

The catalyst mixture used in the process of this invention comprises two components. The first component is an alkaline catalyst which is not a stannate compound. Such catalysts include commonly known ester exchange catalysts. Among such catalysts are alkaline compounds of lithium, sodium, potassium, rubidium, cesium, magnesium, calcium, strontium, barium, aluminum, cobalt, germanium, tin, lead, antimony, and cesium, including the alkoxides thereof. Examples of such compounds are alkali metal hydroxides, alkali metal carbonates, alkaline earth metal carbonates, alkali metal borates, alkaline earth metal borates, lead borate, lead silicate, lead carbonate and cesium trioxide. Other suitable catalysts include salts of organic acids of magnesium, calcium, cesium, barium, ammonia, or a primary of secondary amine. Also suitable are organic bases such as pyridine and other compounds containing a basic nitrogen atom.

Also suitable are borate catalysts including sodium metaborate, sodium metaborate tetrahydrate, sodium metaborate dihydrate, sodium pentaborate pentahydrate, sodium tetraborate decahydrate, sodium tetraborate pentahydrate, lithium ortho-dihydroborate, lithium metaborate, lithium tetraborate, lithium pentaborate pentahydrate, potassium metaborate, potassium tetraborate tetrahydrate, potassium tetraborate pentahydrate, potassium pentaborate tetrahydrate, magnesium metaborate trihydrate, magnesium diborate, calcium tetraborate and strontium tetraborate tetrahydrate.

Preferred alkaline catalysts include the alkali metal carbonates, alkaline earth metal carbonates, ammonium carbonate, alkali metal borates and alkaline earth metal borates. More preferred catalysts are alkali metal carbonates alkali metal hydroxides, and alkali metal borates, with potassium carbonate, sodium metaborate, potassium hydroxide and potassium metaborate being most preferred.

The second component of the catalyst mixture employed herein is a stannate compound. Such stannate compound can be a metal stannate salt or an organostannate compound. Suitable metal stannate salts include those represented by the structure:

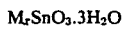

(sometimes written as $M_xSn(OH)_6$)

wherein M is a mono- or divalent metal ion and x is 1 or 2 as required to meet the valence requirements. Preferred metal stannate salts include the alkali metal and alkaline earth metal salts, with sodium, potassium and calcium salts being most preferred on the basis of cost and availability.

Suitable organic stannates include tetraalkyl stannates or tetraalkoxy stannates such as tetramethylstannane, tetraethylstannane, tetramethoxystannate, and the like.

The alkaline catalyst and the stannate compound are employed in catalytic amounts, i.e., amounts sufficient to increase the rate of reaction of the alkylene oxide with the carbon dioxide or the alkylene oxide. Typically, about 0.01 to about 5, preferably about 0.1 to about 2 parts by weight of each of the alkaline catalyst and the stannate compound are used per 100 parts of the product polymer. Preferably, the alkaline catalyst and stannate compound are employed in a weight ratio of about 1:10 to about 10:1, preferably about 1:10 to about 2:1, and more preferably about 1:3 to about 2:1. When a higher proportion of the alkaline catalyst is used, significant amounts of alkylene carbonate are contained in the product PAC.

One of the reactants employed herein is an alkylene oxide. The term "alkylene oxide" is employed herein to designate any compound containing an oxirane ring which is reactive with an alkylene carbonate or carbon dioxide to form a carbonate. Suitable such alkylene oxides include, for example, ethylene oxide, propylene oxide, butylene oxide, hexylene oxide, styrene oxide, epichlorohydrin, epibromohydrin, glycidol and the like. Ethylene oxide and propylene oxide are generally preferred, since they are generally most reactive and give rise to the fewest by-products. Of these, ethylene oxide is most preferred.

Carbon dioxide and/or an alkylene carbonate is another required reactant in the process of this invention. The alkylene carbonate employed herein is advantageously represented by the structure:

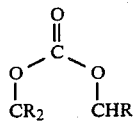

wherein R is independently hydrogen, lower alkyl, aryl and the like. Preferred alkylene carbonates include butylene carbonate, propylene carbonate and especially ethylene carbonate. As discussed more fully hereinafter, the use of carbon dioxide or mixtures thereof with an alkylene carbonate is preferred.

In this invention, the alkylene oxide and the carbon dioxide and/or alkylene carbonate are advantageously employed in ratios roughly corresponding to the desired carbon dioxide content in the PAC. Generally, the amount of carbon dioxide and/or alkylene carbonate is chosen such that the PAC has a carbon dioxide content of about 0.1 to about 30, preferably about 10 to about 25 percent by weight. It is noted that the preferred carbon dioxide content of the PAC may vary depending on the end use thereof. For example, a PAC for use in a polyurethane foam most preferably has a carbon dioxide content of about 13–18% by weight because of the relatively low viscosity of the PAC at that carbon dioxide content. By contrast, a PAC for use in a polyurethane elastomer most preferably has a carbon dioxide content of about 18–25% by weight, since solvent resistance is better at this higher carbon dioxide content. The relative amounts of carbon dioxide and/or alkylene carbonate used in this process are therefore adjusted accordingly.

It is generally preferred to employ in the reaction a polyhydric initiator compound. The presence of such initiator provides a PAC having a desired, more uniform number of terminal groups. The initiator compound advantageously contains from about 2 to about 16, preferably about 2 to about 8, more preferably about 2 to about 4 active hydrogen atoms per molecule. The PAC produced in the presence of such initiator will have a number of terminal groups approximately equal to the number of active hydrogen atoms in the initiator. Suitable initiators include, for example, water, ethylene glycol, propylene glycol, 1,4-butane diol, glycerine, trimethylolpropane, bisphenols, relatively low equivalent weight polyols such as polyether polyols, polyester polyols, PAC polyols and the like, glycol ethers such as di-, tri- and tetraethylene glycol and di-, tri- and tetrapropylene glycol, ethylene diamine, aminoethylethanolamine, piperazine, aminoethylpiperazine and the like. Initiators in which the catalysts are soluble are preferred, but other initiators can be employed. If the catalysts are insoluble in the initiator, a quantity of ethylene carbonate can be added to the initiator to dissolve or disperse the catalysts.

The process of this invention is conducted by charging an autoclave or other reaction vessel which is capable of withstanding superatmospheric internal pressures with the aforedescribed catalyst mixture, the alkylene oxide and the carbon dioxide and/or alkylene carbonate. The initiator, when used, is charged to the reactor at the beginning of the reaction. The contents of the reactor are then heated to about 100° to about 300° C., under a pressure of about 100 to about 1500 psi, to induce polymerization of the reactants. In certain embodiments of the invention, higher pressures can be used to obtain carbon dioxide in a supercritical state. Typical reaction times are about 1 to about 40 hours, although the reaction time will usually decrease with increasing pressure.

Although the entire quantity of the alkylene oxide and carbon dioxide and/or alkylene carbonate may be added to the reactor at the beginning of the reaction, it is preferable to gradually add the gaseous reactants during the course of the reaction. In this manner, better control of the rate of reaction and the pressure inside the reactor is achieved.

When an alkylene carbonate is employed as a starting material, it is advantageously charged to the reactor along with the catalysts at the beginning of the reaction. The alkylene oxide is preferably added to the reactor under reaction conditions over a period of about 2 to about 40, preferably about 10 to about 30 hours. The reactor is also advantageously purged with an inert gas such as nitrogen, or with a gaseous reactant, to remove oxygen and other reactive gases, and padded to about 100 to about 1500, preferably about 140 to about 500 psi with nitrogen at the outset of the reaction. Preferred reaction temperatures in this embodiment of the invention are about 150° to about 200° C. At the conclusion of the alkylene oxide addition, it may be desirable to digest the reaction mixture for a short period to permit the polymerization to be completed.

When carbon dioxide is employed as a starting material, it is preferred to gradually add both the carbon dioxide and the alkylene oxide to the reactor as the polymerization proceeds. In an especially preferred embodiment, the addition of the carbon dioxide to the reactor is accomplished in less time than the addition of the alkylene oxide. In such preferred embodiment, a stoichiometric excess of carbon dioxide, based on the carbon dioxide content of the product PAC, is maintained in the reactor at all times until after the carbon dioxide addition is completed. In such preferred embodiment, the carbon dioxide addition in advantageously completed in less than about 90%, more preferably less than about 70%, most preferably less than about 60% of the time required for the alkylene oxide addition. It has been found that by maintaining an excess of carbon dioxide in the reactor according to the especially preferred embodiment, dramatic decreases in reaction time are achieved, and the use of significantly lower pressures in the reactor are possible. In such especially preferred embodiment, reaction times of about 1 to about 20, preferably about 1 to about 10 hours are typically employed, and reactor pressures of about 150 to about 225 psi especially 160–195 psi are preferred. In such especially preferred embodiment, purging the reactor to remove unwanted gases at the outset of the reaction is preferred. It is noted that although the carbon dioxide is added over a shorter period than the alkylene oxide according to this embodiment of the invention, the relative amounts of carbon dioxide and alkylene oxide added still determine the carbon dioxide content of the PAC.

In another embodiment of this invention, it is possible to carry out the improved process sequentially by first reacting an excess of carbon dioxide or alkylene carbonate with an alkylene oxide in the presence of a stannate compound, and then reacting the intermediate thus obtained with additional alkylene oxide in the presence of the alkaline catalyst to produce the product PAC. During the second step, rearrangement reactions occur which ensure that the PAC has a relatively uniform composition, i.e. does not contain substantial quantities long poly(oxyalkylene) chains.

In yet another embodiment, it is possible to conduct this process at pressures such that the carbon dioxide is present during the reaction in a supercritical state. Although very high pressures are encountered in this embodiment, a very rapid reaction rate is achieved, and this embodiment still provides for the production of PACs having various carbon dioxide contents.

Following the polymerization reaction, it is desirable to remove residual catalyst and impurities from the PAC. Exemplary such processes are described, for example, in U.S. Pat. No. 4,528,364, incorporated herein by reference.

The product PAC advantageously is hydroxylterminated and has an equivalent weight of about 100 to about 5000, preferably about 500 to about 3000, more preferably about 750–2000. These PACs are useful, for example, as raw materials in the production of polyurethanes, particularly polyurethane elastomers and flexible or rigid polyurethane foams. In preparing polyurethanes using the PACs prepared according to this invention, processes as are described, for example, in U.S. Pat. Nos. 3,639,543, 4,495,081, 4,218,543, and 4,451,588, all incorporated herein by reference, are suitable. In general, these processes involve the catalyzed reaction of a polyol with a polyisocyanate at an elevated temperature.

Polyurethane elastomers can be prepared by reacting a relatively high equivalent weight PAC and a low equivalent weight "chain extender" with a polyisocyanate. This reaction is commonly carried out by first reacting the PAC with an excess of the polyisocyanate to form a prepolymer, and then reacting the prepolymer with a chain extender to form the elastomer. Alternatively, all components can be reacted at once in a "oneshot" method. Depending on the reactivity of the components, the reactants can be mixed and molded according to conventional casting methods, or by the so-called reaction injection molding (RIM) method.

Polyurethane foams can be prepared by reacting the PAC with a polyisocyanate in the presence of a blowing agent and a surfactant for stabilizing the foaming reaction mixture until it cures. Suitable blowing agents include water, and low boiling halogenated hydrocarbons such as dichlorodifluoromethane, trifluoromonochloromethane, methylene chloride and the like. A suitable method for preparing a flexible foam is described in the copending application of Prier et al. entitled "Flexible Polyurethane Foams Prepared From Poly(Alkylene Carbonate) Polyols", filed on even date herewith.

Rigid polyurethane foams are generally prepared using a relatively low equivalent weight PAC. Flexible polyurethane foams employ higher equivalent weight PACs, or a mixture thereof with a low equivalent weight isocyanate-reactive material.

Catalysts for the preparation of polyurethanes include, notably, tertiary amine compounds and organometallic compounds. Of particular interest are triethylenediamine and dialkyltincarboxylates such as dibutyltin dilaurate. Other suitable catalysts are described in U.S. Pat. No 4,495,081.

The following examples are provided to illustrate the invention but are not intended to limit the scope thereof. All parts and percentages are by weight unless otherwise indicated.

EXAMPLE 1

Into a 300 milliliter stainless steel reactor are charged 36.1 parts of a 200 equivalent weight PAC diol initiator, 65.6 parts of distilled ethylene carbonate, 0.25 grams sodium stannate ($Na_2SnO_3 3H_2O$) and 0.13 grams potassium carbonate. With stirring, the atmosphere is purged with nitrogen, and then padded with nitrogen to 150 psig. The reactor is heated to 175 C. Over a 13 hour period are added 108 grams of ethylene oxide at approximately 400 psig pressure. After completion of the ethylene oxide addition, the reactor is cooled and 183.9 grams of a PAC containing 17.1% carbon dioxide are recovered.

EXAMPLE 2

Into a 300 milliliter stainless steel reactor are charged 40 grams of a 250 equivalent weight PAC diol containing about 20% by weight carbon dioxide, 1.25 grams of potassium stannate ($K_2SnO_3.3H_2O$) and 0.5 grams potassium carbonate. The reactor is purged with carbon dioxide, and then pressurized to 200 psig with carbon dioxide. About 8 grams of ethylene oxide are added to the reactor. The reactor is then heated to 175 C., and the stirrer started. Additional carbon dioxide is fed to the reactor by means of a feed regulator set to deliver carbon dioxide to the reactor whenever the pressure inside the reactor falls below 400 psig, until a total of 42.5 grams of carbon dioxide are added. All required carbon dioxide is added over about 65 minutes. Starting concurrently with the start of carbon dioxide addition, 164 grams of ethylene oxide are fed to the reactor at a constant rate over 115 minutes. Following the additions of all reactants, the mixture is permitted to digest at 175° C. until the internal pressure falls to 80 psig. The resulting PAC has an equivalent weight of 1170 and contains 20.1% carbon dioxide.

EXAMPLE 3

Into a suitable reactor are charged 225 grams of potassium stannate, 225 g. of potassium carbonate and 5233 grams of a 178 equivalent weight PAC diol containing 17.8% carbon dioxide. After purging the reactor with carbon dioxide, and heating to about 180° C., 37,000 grams of ethylene oxide and 3162 grams of carbon dioxide are added over a period of 22 hours, while maintaining the temperature inside the reactor at about 180° C. and the pressure at about 190 psig. At the conclusion of the reaction, a 646 equivalent weight diol containing 9.1% carbon dioxide is recovered.

EXAMPLE 4

Into a suitable reactor are charged 125 grams of potassium stannate, 150 g. of potassium carbonate and 1030 grams of a 350 equivalent weight PAC triol containing 20% carbon dioxide. After purging the reactor with carbon dioxide, and heating to about 180° C., 37,515 grams of ethylene oxide and 2187 grams of carbon dioxide are added over a period of 15.5 hours, while maintaining the temperature inside the reactor at about 180° C. and the pressure at about 350 psig. At the conclusion of the reaction, a 1003 equivalent weight triol containing 8.7% carbon dioxide is recovered.

EXAMPLE 5

Into a suitable reactor are charged 125 grams of potassium stannate, 100 g. of potassium carbonate and 9905 grams of a 315 equivalent weight PAC triol containing 20% carbon dioxide. After purging the reactor with carbon dioxide, and heating to about 180° C., 34,673 grams of ethylene oxide and 5623 grams of carbon dioxide are added over a period of 13 hours, while maintaining the temperature inside the reactor at about 180° C. and the pressure at about 350 psig. At the conclusion of the reaction, a 1150 equivalent weight triol containing 15.1% carbon dioxide is recovered.

COMPARATIVE EXAMPLE A

In this example, it is attempted to prepared a PAC containing a low carbon dioxide content using sodium stannate as the sole catalyst, by employing a very high ratio of ethylene oxide to carbon dioxide.

To a suitable reactor are charged 818 grams monoethylene glycol and 8 grams sodium stannate. After purging the reactor with nitrogen and heating to 175° C., 3692 grams ethylene oxide and 923 grams carbon dioxide are continuously co-fed into the reactor at 9.0 grams/minute and 2.2 grams/minute, respectively. During the addition, the pressure in the reactor peaks at 300 psig, and the temperature is maintained at 175° C. The resulting product has an equivalent weight of about 204 and contains about 20.4% carbon dioxide. However, when the weight of the initiator is subtracted out, it is seen that the material actually polymerized has a carbon dioxide content of 24%, despite the great stoichiometric excess of ethylene oxide present in the reaction.

A 818 gram sample of this material is reacted, under substantially the same conditions, with about 3900 grams ethylene oxide and 950 grams carbon dioxide, again using only sodium stannate as the catalyst. The product has an equivalent weight of about 825 and contains 26.6% carbon dioxide. Further reaction of this material with the same ratios of ethylene oxide and carbon dioxide produces a 1024 equivalent weight PAC containing 28% carbon dioxide.

What is claimed is:

1. An improved process for the preparation of a poly-(alkylene carbonate)polymer by the reaction of an alkylene oxide with carbon dioxide and/or an alkylene carbonate at an elevated temperature and pressure, the improvement comprising conducting said reaction in the presence of a catalytic amount of a catalyst mixture comprising an alkaline catalyst and a metal stannate salt, a tetraalkyl stannane compound and/or a tetraalkoxy stannate compound.

2. The process of claim 1 wherein said stannate compound comprises an alkali metal stannate, or an alkaline earth stannate.

3. The process of claim 2 wherein said alkaline catalyst comprises a magnesium, calcium, cesium or barium salt of an organic acid, or organic compound containing a basic nitrogen atom.

4. The process of claim 2 wherein said alkaline catalyst comprises an alkali metal or alkaline earth metal carbonate, phosphate or metaborate.

5. The process of claim 4 wherein said alkaline catalyst comprises sodium carbonate, potassium carbonate or sodium metaborate.

6. The process of claim 5 wherein said stannate compound comprises sodium or potassium stannate.

7. The process of claim 6 wherein the reaction is conducted at a temperature of about 100°–300° C. and a pressure of about 100 to about 1500 psi.

8. The process of claim 7 wherein said alkylene oxide is reacted with an alkylene carbonate, and said pressure is from about 140 to about 500 psi.

9. The process of claim 8 wherein said alkylene oxide comprises ethylene oxide and said alkylene carbonate comprises ethylene carbonate.

10. The process of claim 7 wherein said alkylene oxide is reacted with carbon dioxide.

11. The process of claim 10 wherein said alkylene oxide and carbon dioxide are gradually added to the reaction, said additions being conducted under reaction conditions.

12. The process of claim 11 wherein said carbon dioxide is gradually added to the reaction over a shorter period of time than the alkylene oxide is added.

13. The process of claim 12 wherein said alkylene oxide is ethylene oxide.

14. The process of claim 13 wherein the pressure is about 150–225 psi.

15. An improved process for the preparation of a poly(alkylene carbonate) polymer by the reaction of an alkylene oxide with carbon dioxide and/or an alkylene carbonate at an elevated temperature and pressure, the improvement comprising conducting said reaction in the presence of a catalyst mixture comprising an alkaline catalyst and an alkali or alkaline earth metal stannate salt.

* * * * *